May 19, 1970 NORIO ABE ETAL 3,513,419

DEVICE FOR SWITCHING FREQUENCY BANDS IN BROADCASTING RECEIVER

Filed Nov. 22, 1966 2 Sheets-Sheet 1

DEVICE FOR SWITCHING FREQUENCY BANDS IN BROADCASTING RECEIVER

Filed Nov. 22, 1966 2 Sheets-Sheet 2

United States Patent Office 3,513,419
Patented May 19, 1970

3,513,419
DEVICE FOR SWITCHING FREQUENCY BANDS IN BROADCASTING RECEIVER

Norio Abe, Hiromu Kishi, and Tsuneo Fujita, Amagasaki, Japan, assignors to Mitsubishi Denki Kabushiki Kaisha, Tokyo, Japan Filed Nov. 22, 1966, Ser. No. 596,130
Claims priority, application Japan, Nov. 26, 1965, 40/95,859; Feb. 10, 1966, 41/11,398
Int. Cl. H03j 3/20
U.S. Cl. 334—52 3 Claims

ABSTRACT OF THE DISCLOSURE

A two band radio receiver has two frequency scales arranged consecutively end-to-end and a pointer which is capable of relative movement along both scales and hence crosses over the border from one scale to the other. Relative movement of the pointer and scales is effected by a turning knob carrying an arcuate control member engageable with a change-over switch for switching from one frequency band to the other when the pointer crosses a border between the two frequency scales.

This invention relates in general to a device for switching frequency bands in a two band broadcasting receiver and more particularly to improvements in a device for changing one to the other of the frequency modulated (FM) broadcasting band of from 88.1 to 107.9 megacycles per second and the amplitude modulated (AM) broadcasting band of from 550 to 1600 kilocycles per second in such a receiver.

The conventional type of two band broadcasting receivers for selectively receiving two frequency bands such as the FM and AM broadcasting bands just described includes a dialing device comprising either a single tuning pointer adapted to travel along two juxtaposed frequency scales carried on a dial plate or separate tuning pointers one for each frequency band adapted to travel along the associated frequency scales and frequency-band selector provided for that purpose to change the AM band to the FM band and vice versa. Such receivers are inconvenient in that, whenever one desires to determine which of the frequncy bands has been set to be received when a power switch involvd is in its open position an indication on the band selector must be viewed by him or her and also they are troublesome in that each time it is desired to change the frequency band, the band selector must be operated.

A general object of the invention is, accordingly, to eliminate the abovementioned drawbacks.

An object of the invention is to provide new and improved means by which a tuning knob serves to effect tuning as well as switching two frequency bands such as the AM and FM broadcasting bands Another object of the invention is to provide a new and improved indication device in which a single tuning pointer or index serves to indicate any desired frequency to be receved in each of the FM and AM broadcasting bands while a glance at the tuning pointer or index on the associated dial plate indicates which of the bands has been set to be received even if a power switch involved is in its open position.

A still further object of the invention is to ensure that at the instant a single tuning pointer transits a border between two frequency scales for the FM and AM broadcasting bands a frequency band to be received changes from the FM to the AM band and vice versa and that even if the tuning pointer is positioned adjacent either end of the frequency scales tuning is precisely effected.

With the above cited objects in mind, the invention resides in a device for switching frequency bands in a two band broadcasting receiver for selectively receiving two frequency bands such as the FM and AM broadcasting bands, comprising a dial plate carrying thereon one frequency scale corresponding to each of the frequency bands, the two frequency scales being consecutive to each other to form a broad therebetween, a rotatable tuning knob, a single tuning pointer capable of relatively traveling along both frequency scales by the tuning knob, a frequency band change-over switch having two operative positions one of which permits one of the two frequency bands to be received and the other of which permits the other frequency band to be received, control means operatively coupled to the tuning knob to change the band change-over switch from one to the other of the operative positions upon transiting the tuning pointer over the border between the two frequency scales whereby the frequency band is switched.

The invention as to its organization and its mode of operation as well as additional objects and advantages thereof will become more readily apparent from the following detailed description when taken in conjunction with the accompanying drawings in which.

Throughout the figures like reference numerals have been employed to identify the corresponding or similar parts.

Figure 1:
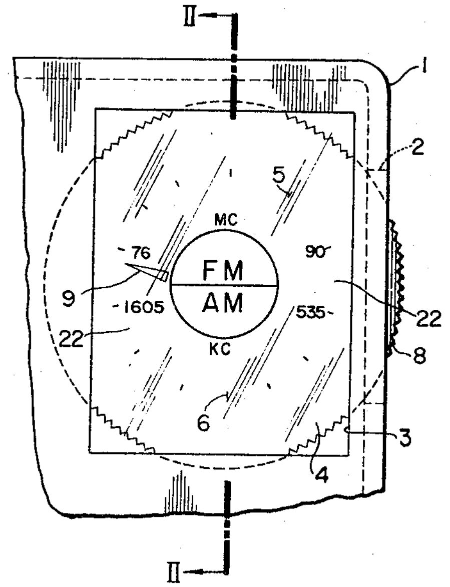
FIG. 1 is a fragmental front view of a device constructed in accordance with the teachings of the invention to be incorporated into a rotary pointer device.
Figure 3:
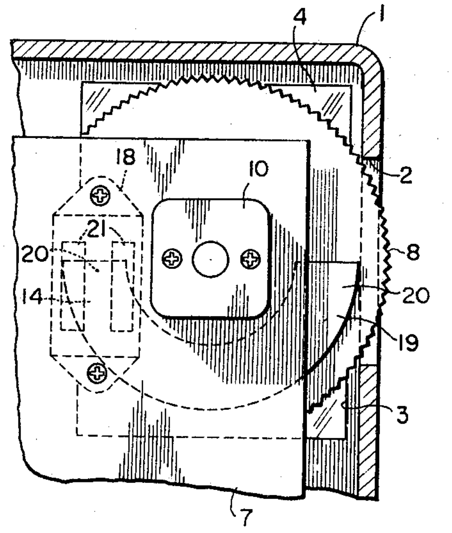
FIG. 3 is a fragmental longitudinal sectional view taken along the line of III—III of FIG. 2.
Figure 2:
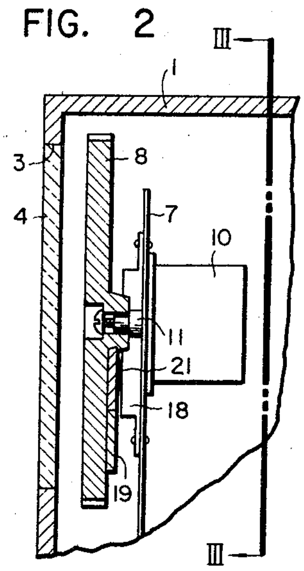
FIG. 2 is a fragmental longitudinal sectional view taken along the line II—II of FIG. 1.

Referring now to FIGS. 1 through 3, the reference numeral 1 generally designates a receiver casing provided on the upper portion of one side wall, in this case, on the righthand side wall as viewed in FIG. 1 with a longitudinal slit 2 and on the upper and righthand corner portion with an opening 3 which may be preferably of a rectangular shape. Directly behind the opening 3 a dial plate 4 of any suitable transparent material such as a transparent plastic is suitably secured and carries thereon a pair of frequency scales arranged in a single circle. As shown in FIG. 1, the frequency scale 5 disposed on one half, for example or the upper half, of the circle covers a frequency range of from 88 to 108 megacycles per second for the purpose of receiving the FM broadcasting band of from 88 to 107.9 megacycles per second while the frequency scale 6 disposed on the lower half thereof covers a frequency range of from 550 to 1600 kilocycles per second for the purpose of receiving the AM broadcasting band. However it is to be understood that the invention is equally applicable to switching any two desired frequency bands other than those just specified.

Figure 4:
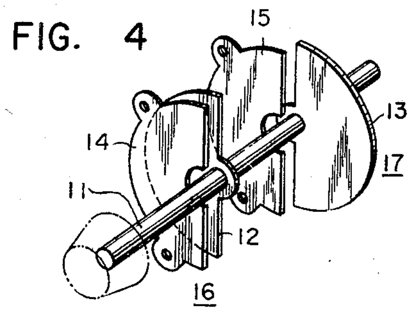
FIG. 4 is a schematic perspective view of a pair of variable tuning capacitors which may be used with the invention.

As best shown in FIG. 2, a supporting plate 7 of any suitable rigid material is disposed rearwardly of the opening 3. Rotatably disposed between the opening 3 and the supporting plate 7 is a tuning knob 8 in the form of a flat disk having a knurled periphery in axially spaced and aligned relationship. The tuning knob 8 partly projects beyond the longitudinal slit 2 on the side casing wall in order to rotate the knob manually. The tuning knob 8 is provided on the surface thereof facing the dial plate 4 with a tuning pointer 9 adapted to travel along both frequency scales 5 and 6 to indicate a desired frequency to be received in the conventional manner. The supporting plate 7 has a capacitor box 10 secured on the side remote from the tuning knob 8 as by screws. A capacitor shaft 11 rigidly connected to the tuning knob 8 at its center is rotatably journalled by a bearing (not shown) in the supporting plate 7 and extends into the capacitor box 10. Within the capacitor box 10 a pair of movable capacitor plates 12 and 13 are fixedly mounted on the shaft 11 so as to be spaced away from each other axially of the shaft 11 and oppose each other diametrically with respect to the axis of the shaft. Further a pair of stationary capacitor plates 14 and 15 are disposed in axially spaced and aligned relationship within the capacitor box 10 to form the variable capacitors 16 and 17 with the movable plates 12 and 13 respectively. In FIG. 4, the movable plate 12 is shown as substantially completely superposing the mating stationary plate 14 to provide a maximum capacity of the variable capacitor 16 for one of the two frequency bands, for example, the AM band. As the common shaft 11 is rotated in either direction, the movable plate 12 progressively offsets the stationary plate 14 to decrease gradually the capacity of the variable capacitor 16 until the movable plate 12 fully offsets the stationary plate 14 after rotation of the shaft 10 through an angle of 180 degrees. A further rotation of the shaft 11 in the same direction causes the movable plate 13 to overlap progressively the mating stationary plate 15 to increase gradually the capacity of the variable capacitor 17 for the FM band until the movable plate 13 fully superposes the stationary plate 15 providing the maximum capacity.

While each of the variable capacitors is shown as comprising a pair of capacitor plates it is to be understood that the capacitor may be comprised of any desired number of capacitor plates dependent upon the frequency band to be received.

As best shown in FIG. 3, a frequency change-over switch 18 is mounted on the supporting plate 7. The band change-over switch 18 has two operative positions or one position effective for reception one of the bands for example the FM band and the other position effective for reception of the AM band as will be described hereinafter.

In order to permit the band change-over switch 18 to change one to the other of its operative positions, a control element 19 in the form of a semi-circular annulus coextensive with one of the frequency scales is mounted substantially concentrically on the rear surface or that surface opposing the supporting plate 7 of the tuning knob 8 on that portion corresponding to the other frequency band so that the control element passes above the band change-over switch 18 during rotational movement thereof. The control element 19 has both ends 20, 20 tapered circumferentially. In addition, the switch 18 has a pair of resilient switching arms 21. When the control element 19 is engaging the switching arms 21, the latter press the switch 18 to maintain it in the operative position effective for reception of the one frequency band, for example the FM band while when the control element 19 disengages from the switching arms 21 the latter urges and maintains the band change switch in the other operative position effective for reception of the AM band. If desired, a single switching arm may be provided. It is to be noted that transition of the tuning pointer 9 over either of borders 22 formed between the FM and AM scales 5 and 6 causes the control element 19 to engage and disengage from the switching arms 21 whereupon one of the frequency bands is changed to the other frequency band.

Figure 5:
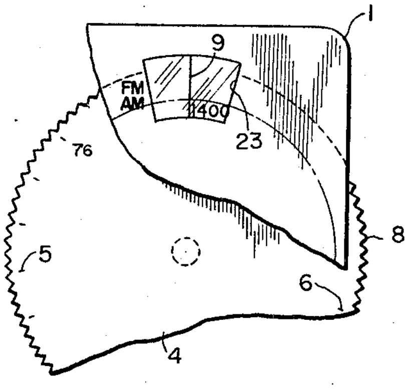
FIG. 5 is a fragmental front view of a modification of the device illustrated in FIG. 1.

FIG. 5 illustrates a modification of the device shown in FIGS. 1 through 4 wherein a tuning knob such as that shown at 8 in FIGS. 1 through 3 also serves as a dial plate with the previously described dial plate 4 omitted. A casing 1 is provided on the upper and righthand corner of the front face with a small viewing window 23 instead of the relatively large opening 3 as previously described for FIGS. 1 through 3 and a tuning knob 8 substantially identical to the knob 8 as previously described carries on that surface facing the window 23 a pair of frequency scales such as the FM and AM scales 5 and 6 in the form of a semi-circle disposed in diametrically opposed relationship but on different concentric circles. The window 23 has an index 9 located substantially at its center. Thus as the tuning knob 8 is manually rotated, the successive incremental portions of either frequency band 5 or 6 are exposed to the viewing window 23. In the other respects, the arrangements shown in FIG. 5 is identical in construction to that illustrated in FIGS. 1 through 4.

Figure 6:
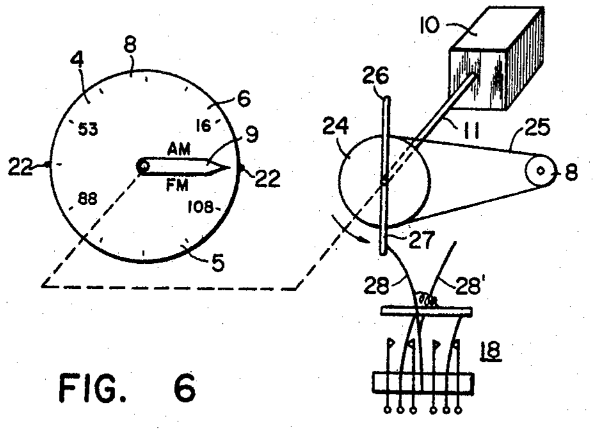
FIG. 6 is a diagrammatic view of another modification of the invention.

Referring now to FIG. 6, there is illustrated a modification of the invention wherein a dial plate is not required axially to align with a tuning knob which leads to an advantage that the dial plate can be disposed at any desired position on the front face of the associated receiver casing. As shown in FIG. 6 an arrangement illustrated comprises a dial plate 4 preferably of a circular shape having a pair of frequency scales such as FM and AM scales 5 and 6 disposed on the front face in the same manner as previously described in conjunction with FIG. 1. A tuning pointer 9 is disposed on the front face of the dial plate 8 for rotation about the center of the latter. As shown in dotted lines in FIG. 6, the tuning pointer 9 is mechanically coupled to an operating drum 24 of conventional construction suitably mounted within the receiver casing 1. The drum is operatively coupled to a tuning knob 8 through an endless transmission string 25 in the conventional manner. If desired, the dial plate may be mechanically coupled to the operating drum with the tuning pointer stationary.

Figure 7:
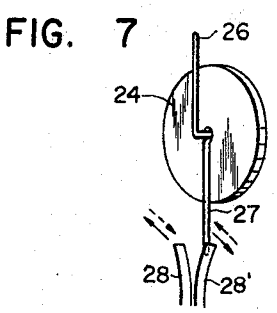
FIG. 7 is a fragmental perspective view illustrating the positional relationship between a band change-over switch and the associated control rods shown in FIG. 6.

In order to switch the two frequency bands upon passing the tuning pointer 9 past either border 22 between the two frequency scales 5 and 6 as in the device illustrated in FIGS. 1 through 4, the operating drum 24 is provided on one face with a pair of radial control rods 26 and 27 disposed in a common diameter but at different levels with respect to the plane of that face so as to project beyond the periphery (see FIG. 7) and a frequency-band change-over switch is disposed at such a position that it can be controlled by either of the control rods 26 or 27 on the operating drum 24 during its rotational movement. The switch is shown in FIG. 6 as comprising a double throw two pole switch 18 having a pair of spring-loaded resilient switching arms 28 and 28′ bent in the opposite directions and capable of engaging the control rods 26 and 27 respectively to change the switch from one to the other closed or operative positions. As previously described, the switch serves to switch electrical circuits (not shown) required for changing the frequency bands. The control rods 26 and 27 are preset to actuate the associated switching arms 28 and 28′ respectively at the instant the tuning pointer 9 transits either border 22 between the two frequency bands 5 and 6.

If due to rotation of the tuning knob 8, the operating drum 24 is rotated in the direction of the arrow in FIG. 6 to cause the control rod 26 for example to abut against the switching arm 28, the latter is reversed in bending direction rapidly to change the switch from one to the other of the closed positions. At the same time the switching element 28′ will also be reversed in bending direction. Then when the control rod 27 abuts against the switching arm 28′ reversed in bending direction to return rapidly back the switch to the original closed position.

If the tuning knob 8 is rotated in the direction reversed from that just described the control rod 26 or 27 will abut against the associated switching arm 28 or 28' from the reversed side to change rapidly the operative positions of the switch 18 resulting in switching of the frequency bands.

As shown in FIG. 6, the operating drum 24 has a capacitor shaft 11 extending from its center into a capacitor box 10 identical to the capacitor box as previously described in conjunction with FIG. 4.

While the invention has been described in terms of the rotary pointer and dial types, it is to be understood that the same is equally applicable to a translational pointer type which will subsequently be described in conjunction with FIG. 8.

Figure 8:
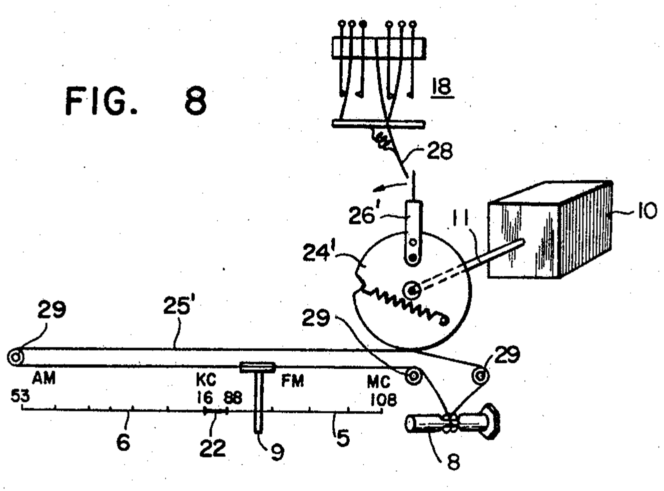
FIG. 8 is a diagrammatic view of a device constructed in accordance with the teachings of the invention to be incorporated into a translation pointer device.

In FIG. 8, a tuning pointer 9 is secured to an endless transmission string 25' guided by a plurality of rollers 29 and operatively coupled to both a tuning knob 8 and an operating drum 24 in the conventional manner. The tuning knob 8 is operated to travel the tuning pointer 9 along a pair of frequency scales such as the FM and AM scales 5 and 6 arranged on a common horizontal line on a dial plate (not shown) with a border portion 22 sandwiched therebetween. If desired, both frequency scales may be arranged on a common vertical line with the tuning pointer traveling in the vertical direction.

In the arrangement shown in FIG. 8, it will be seen that the tuning pointer 9 travels the full length of either of the frequency scales during one complete revolution of the operating drum 24'. Therefore a single control rod 26 rather than two rods is provided on the operating drum 24' to control a frequency-band change-over switch 18 similar to the corresponding switch as above described in conjunction with FIG. 7 except for the provision of a single spring-loaded resilient switching element 28'. Also as will be readily understood, a capacitor shaft 11 operatively coupled to the operating drum 24' is rotated at a speed equal to a half the speed of rotation of the drum. In the other respects the arrangement illustrated in FIG. 8 is identical to that shown in FIG. 7.

From the foregoing it will be appreciated that the objects of the invention have been accomplished by the provision of one frequency scale for one of two frequency bands consecutive to the other frequency scale for the other frequency-band and of means for operating a frequency-band change-over switch upon transiting a tuning pointer over a border between the two frequency bands due to the rotational movement of a tuning knob.

While the invention has been illustrated and described in conjunction with certain preferred embodiments thereof it is to be understood that various changes and modification will be resorted to without departing from the spirit and scope of the invention.

What we claim is:

1. A device for switching the FM broadcasting band to the AM broadcasting band and vice versa in a two band broadcasting receiver, comprising a dial plate carrying thereon one frequency scale of semi-circular shape corresponding to each of the FM and AM bands, said two frequency scales being consecutive to each other to form a pair of borders therebetween, a tuning knob rotatably disposed in axially spaced and superposed relationship with respect to said dial plate, a tuning pointer disposed on said tuning knob, a frequency-band change-over switch operatively coupled to said tuning knob and having two operative positions effective for reception of the FM and AM band respectively, said frequency-band change-over switch including a resilient switching arm, a control element in the form of a semi-circular annulus secured on the rear surface of said tuning knob on that portion corresponding to one of the FM and AM bands, and capable of engaging and disengaging from said switching arm to change said band change-over switch from one to the other of its operative positions, the arrangement being such that at the instant said tuning pointer transits either of said borders between the FM and AM bands, said band change-over switch is changed from one to the other of its operative positions by operation of said tuning knob.

2. A device for switching the FM broadcasting band to the AM broadcasting band and vice versa in a two band broadcasting receiver, comprising a rotatable tuning knob carrying on the front face one frequency scale of semi-circular shape corresponding to each of the FM and AM bands, said two frequency scales being consecutive to each other to form a pair of borders therebetween, a transparent dial plate disposed in axially spaced and superposed relationship with respect to said tuning knob and having a tuning index, a frequency-band change-over switch operatively coupled to said tuning knob and having two operative positions effective for reception of the FM and AM band respectively, said band change-over switch including a resilient switching arm, a control element in the form of a semi-circular annulus secured on the rear surface of said tuning knob on that portion corresponding to one of the FM and AM bands, and capable of engaging and disengaging from said switching arm to change said band change-over switch from one to the other of its operative positions, the arrangement being such that at the instant said tuning index relatively transits either of said borders between said FM and AM bands, said band change-over switch is changed from one to the other of said operative position by operation of said tuning knob.

3. A device as claimed in claim 1, wherein said tuning knob has extending from its center a capacitor shaft on which one movable capacitor plate means of a variable tuning capacitor for use in reception of each of the FM and AM band is mounted.

References Cited

UNITED STATES PATENTS

| | | | |
|---|---|---|---|
| 2,039,885 | 5/1936 | Chunn | 334—52 X |
| 2,589,331 | 3/1952 | Broos | 334—52 |

HERMAN KARL SAALBACH, Primary Examiner

P. L. GENSLER, Assistant Examiner

U.S. Cl. X.R.

325—458; 334—78, 87